United States Patent
Perez (10) Patent No.: US 12,212,279 B1
(45) Date of Patent: Jan. 28, 2025

(54) SOLAR PANEL WASHING DEVICE

(71) Applicant: Amanda Perez, New Braunfels, TX (US)

(72) Inventor: Amanda Perez, New Braunfels, TX (US)

(*) Notice: Subject to any disclaimer, the term of this patent is extended or adjusted under 35 U.S.C. 154(b) by 47 days.

(21) Appl. No.: 17/883,826

(22) Filed: Aug. 9, 2022

(51) Int. Cl.
*H02S 40/10* (2014.01)
*A46B 13/02* (2006.01)
*B08B 1/12* (2024.01)
*B08B 1/30* (2024.01)

(52) U.S. Cl.
CPC ............. *H02S 40/10* (2014.12); *A46B 13/02* (2013.01); *B08B 1/12* (2024.01); *B08B 1/30* (2024.01); *A46B 2200/3073* (2013.01)

(58) Field of Classification Search
CPC ............ H02S 40/10; B08B 1/30; A46B 13/02
See application file for complete search history.

(56) References Cited

U.S. PATENT DOCUMENTS

2014/0041138 A1* 2/2014 Adler ............... H02S 40/10
15/102
2021/0351740 A1* 11/2021 Nagler ............... F24S 40/20

FOREIGN PATENT DOCUMENTS

| CN | 114978024 A | * | 8/2022 | |
| CN | 115441828 A | * | 12/2022 | |
| EP | 2695683 A1 | * | 2/2014 | ............. B08B 1/008 |

* cited by examiner

*Primary Examiner* — Shay Karls (57) ABSTRACT

The solar panel washing device is a mechanical device. The solar panel washing device incorporates a cleaning structure, a photovoltaic cell, and a water source. The cleaning structure forms a fluidic connection with the water source. The cleaning structure cleans the photovoltaic cell. The cleaning structure discharges water received from the water source onto the photovoltaic cell. The solar panel washing device removes dirt and detritus from the photovoltaic cell.

10 Claims, 7 Drawing Sheets

SOLAR PANEL WASHING DEVICE

CROSS REFERENCES TO RELATED APPLICATIONS

This application claims the benefit of priority to provisional application 63/711,649 that was filed on May 23, 2022 by the applicant, Amanda Perez.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of details of cleaning machines or methods involving the use or presence of a fluid. (B08B2203/00)

SUMMARY OF INVENTION

The solar panel washing device is a mechanical device. The solar panel washing device comprises a cleaning structure, a photovoltaic cell, and a water source. The cleaning structure forms a fluidic connection with the water source. The cleaning structure cleans the photovoltaic cell. The cleaning structure discharges water received from the water source onto the photovoltaic cell. The solar panel washing device removes dirt and detritus from the photovoltaic cell.

These together with additional objects, features and advantages of the solar panel washing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar panel washing device in detail, it is to be understood that the solar panel washing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar panel washing device.

It is therefore important that the claims be regarded as including such equivalent construction insofar as they do not depart from the spirit and scope of the solar panel washing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The solar panel washing device 100 (hereinafter invention) is a mechanical device. The invention 100 comprises a cleaning structure 101, a photovoltaic cell 102, and a water source 103. The cleaning structure 101 forms a fluidic connection with the water source 103. The cleaning structure 101 cleans the photovoltaic cell 102. The cleaning structure 101 discharges water received from the water source 103 onto the photovoltaic cell 102. The invention 100 removes dirt and detritus from the photovoltaic cell 102.

The water source 103 is a source of clean water. The water source 103 forms a fluidic connection with the cleaning structure 101. The water source 103 provides the water under pressure to the cleaning structure 101. The cleaning structure 101 uses the water received from the water source 103 to clean the photovoltaic cell 102. The water source further comprises a hose 131. The hose 131 is a tubular structure. The hose 131 is a flexible structure. The hose 131 is a fluid transport structure. The hose 131 forms a fluidic connection between the water source 103 and the cleaning structure 101. The hose 131 provides clean water to the cleaning structure 101.

The photovoltaic cell 102 is an electric device. The photovoltaic cell 102 converts electromagnetic radiation from the environment into electric energy. The cleaning structure 101 discharges water received from the water source 103 directly onto the surface of the photovoltaic cell 102 that receives the electromagnetic radiation.

The cleaning structure 101 is an electromechanical device. The cleaning structure 101 is associated with the photovoltaic cell 102. The cleaning structure 101 forms a fluidic connection with the photovoltaic cell 102. The cleaning structure 101 cleans the photovoltaic cell 102 by discharging water received from the water source 103 directly onto the photovoltaic cell 102. The cleaning structure 101 comprises a perimeter track 111, a gantry structure 112, and a belt drive 113. The gantry structure 112 and the belt drive 113 mount on the perimeter track 111.

The perimeter track 111 is a track. The gantry structure 112 mounts on the perimeter track 111. The perimeter track 111 elevates the gantry structure 112 above the photovoltaic cell 102. The perimeter track 111 forms a track that guides the motion of the gantry structure 112 over the photovoltaic cell 102 during the cleaning process. The perimeter track 111 comprises a first rail 141 and a second rail 142.

The first rail 141 is a rail. The first rail 141 forms a track that follows along a portion of the perimeter of the photovoltaic cell 102. The first rail 141 is a load bearing structure. The gantry structure 112 mounts on the first rail 141 such that the gantry structure 112 rolls along the track formed by the first rail 141. The first rail 141 forms a load path that transfers a portion of the load of the gantry structure 112 to a load bearing structure.

The second rail 142 is a rail. The second rail 142 forms a track that follows along a portion of the perimeter of the photovoltaic cell 102. The second rail 142 is a load bearing structure. The gantry structure 112 mounts on the second rail 142 such that the gantry structure 112 rolls along the track formed by the second rail 142. The second rail 142 forms a load path that transfers a portion of the load of the gantry structure 112 to a load bearing structure.

The gantry structure 112 is a mechanical apparatus. The gantry structure 112 forms the structure that cleans the photovoltaic cell 102. The gantry structure 112 mounts on the perimeter track 111. The gantry structure 112 is a rolling structure. The gantry structure 112 rolls along the path formed by the perimeter track 111. The gantry structure 112 comprises a u-shaped structure 151, a plurality of rail wheels 152, a spray nozzle 153, a brush structure 154, and a fitting 155.

The u-shaped structure 151 is a mechanical structure. The u-shaped structure 151 forms the substructure that forms the basis of the gantry structure 112. The u-shaped structure 151 is a rigid structure. The u-shaped structure 151 is a u-shaped structure. The plurality of rail wheels 152 attaches to the u-shaped structure 151. The spray nozzle 153 attaches to the u-shaped structure 151. The brush structure 154 attaches to the u-shaped structure 151. The plurality of rail wheels 152 forms a rolling structure.

The plurality of rail wheels 152 mounts on the perimeter track 111 such that the gantry structure 112 rolls over the perimeter track 111. A first subset of rail wheels selected from the plurality of rail wheels 152 mounts on the first rail 141. A second subset of rail wheels selected from the plurality of rail wheels 152 mounts on the second rail 142.

The spray nozzle 153 is a nozzle. The spray nozzle 153 receives water under pressure from the water source 103 through the fitting 155. The spray nozzle 153 receives water from the water source 103. The spray nozzle 153 discharges the received water onto the photovoltaic cell 102 as a spray as the gantry structure 112 rolls over the photovoltaic cell 102.

The brush structure 154 is a brush. The brush structure 154 sweeps dirt and debris off of the photovoltaic cell 102 as the gantry structure 112 rolls over the photovoltaic cell 102.

The fitting 155 forms a fluidic connection between the hose 131 from the water source 103 and the spray nozzle 153. The fitting 155 feeds water into the spray nozzle 153.

The belt drive 113 attaches to the gantry structure 112. The belt drive 113 provides the motive forces necessary to roll the gantry structure 112 along the perimeter track 111. The gantry structure 112 rolls over the surface of the photovoltaic cell 102 that receives the electromagnetic radiation. The gantry structure 112 sprays clean water on the photovoltaic cell 102. The belt drive 113 is a mechanical apparatus. The belt drive 113 is an electrically powered apparatus. The belt drive 113 is a rotating structure. The belt drive 113 attaches to the gantry structure 112. The belt drive 113 converts electric energy into rotational energy. The belt drive 113 transmits the converted rotational energy to the gantry structure 112. The rotational energy received by the gantry structure 112 provides the motive forces necessary to roll the gantry structure 112 along the path formed by the perimeter track 111.

The belt drive 113 comprises a drive motor 161, a remote control receiver 162, and a remote control transmitter 163. The drive motor 161 is an electric motor. The drive motor 161 converts electric energy into the rotational energy. The drive motor 161 forms a linkage with the belt drive 113 such the rotational energy generated by the drive motor 161 provides the belt drive 113 with the motive forces necessary for operation. The remote control receiver 162 forms a portion of the control structure of the belt drive 113. The remote control receiver 162 is a receiver. The remote control receiver 162 electrically connects with the drive motor 161. The remote control receiver 162 controls the operation of the drive motor 161. The remote control receiver 162 receives operating instructions from the remote control transmitter 163. The remote control transmitter 163 is a transmitter. The remote control transmitter 163 transmits operating instructions to the gantry structure 112 and the drive motor 161. The remote control transmitter 163 allows for the remote control of the cleaning structure 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Belt Drive: As used in this disclosure, the belt drive is a transmission. The belt drive comprises a belt, a drive pulley, one or more transfer pulleys, and a drive mechanism. The belt is threaded around that drive pulley and the one or more transfer pulleys to form a loop. The drive mechanism attaches to the drive pulley such that the rotation of the drive mechanism rotates the belt around the one or more transfer pulleys. The rotation of the belt around the one or more transfer pulleys transfers the rotational energy from the drive mechanism to the one or more transfer pulleys such that each of the one or more transfer pulleys can rotate a load attached to the transfer pulley. A transfer pulley that changes the direction of the track but does not rotate a load is called an idler pulley. A chain drive is a belt drive wherein: a) the belt is replaced by a chain; and each of the drive pulley; and, b) each of the one or more transfer pulleys is a gear structure.

Brush: As used in this disclosure, a brush is a tool comprising a plurality of bristles set into a handle or a base that is used for grooming, sweeping, smoothing, scrubbing, or painting.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detritus: As used in this disclosure, detritus refers to an accumulation of unwanted material on a surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure or a first sub-structure: a) to which an object or a second sub-structure attaches; and, b) which forms a portion of the load path of the object or the second sub-structure.

Framework: As used in this disclosure, a framework refers to a second object or structure that encloses a first object or structure.

Gantry: As used in this disclosure, a gantry is an elevated load bearing structure used to transport a load above a horizontal surface.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

Nozzle: As used in this disclosure, a nozzle is a device that receives fluid under pressure and releases the fluid in a controlled manner into an environment. An intake nozzle refers to a device that generates a negative pressure within the nozzle structure such that the intake nozzle draws a fluid into the intake nozzle from a reservoir.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rail: As used in this disclosure, a rail is a continuous structure that forms a path that is used to guide the motion of an object.

Remote Control: As used in this disclosure, remote control means the establishment of control of a device from a distance. Remote control is generally accomplished through the use of an electrical device that generates electrically based control signals that are transmitted via radio frequencies or other means to the device.

Rigid Structure: As used in this disclosure, a rigid structure is a solid structure formed from an inelastic material that resists changes in shape. A rigid structure will permanently deform as it fails under a force. See bimodal flexible structure.

Roof: As used in this disclosure, a roof refers to the superior surface of a hollow structure. The roof typically encloses the hollow structure.

Solid: As used in this disclosure, a solid refers to a state (phase) of matter that: 1) has a fixed volume; and, 2) does not flow.

Spray Nozzle: As used in this disclosure, a spray nozzle is a device that receives liquid under pressure and disperses that liquid into the atmosphere as a spray.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Track: As used in this disclosure, a track is a device that is used to control the path of motion of an object in at least one dimension and in a maximum of two dimensions.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Figure 1:
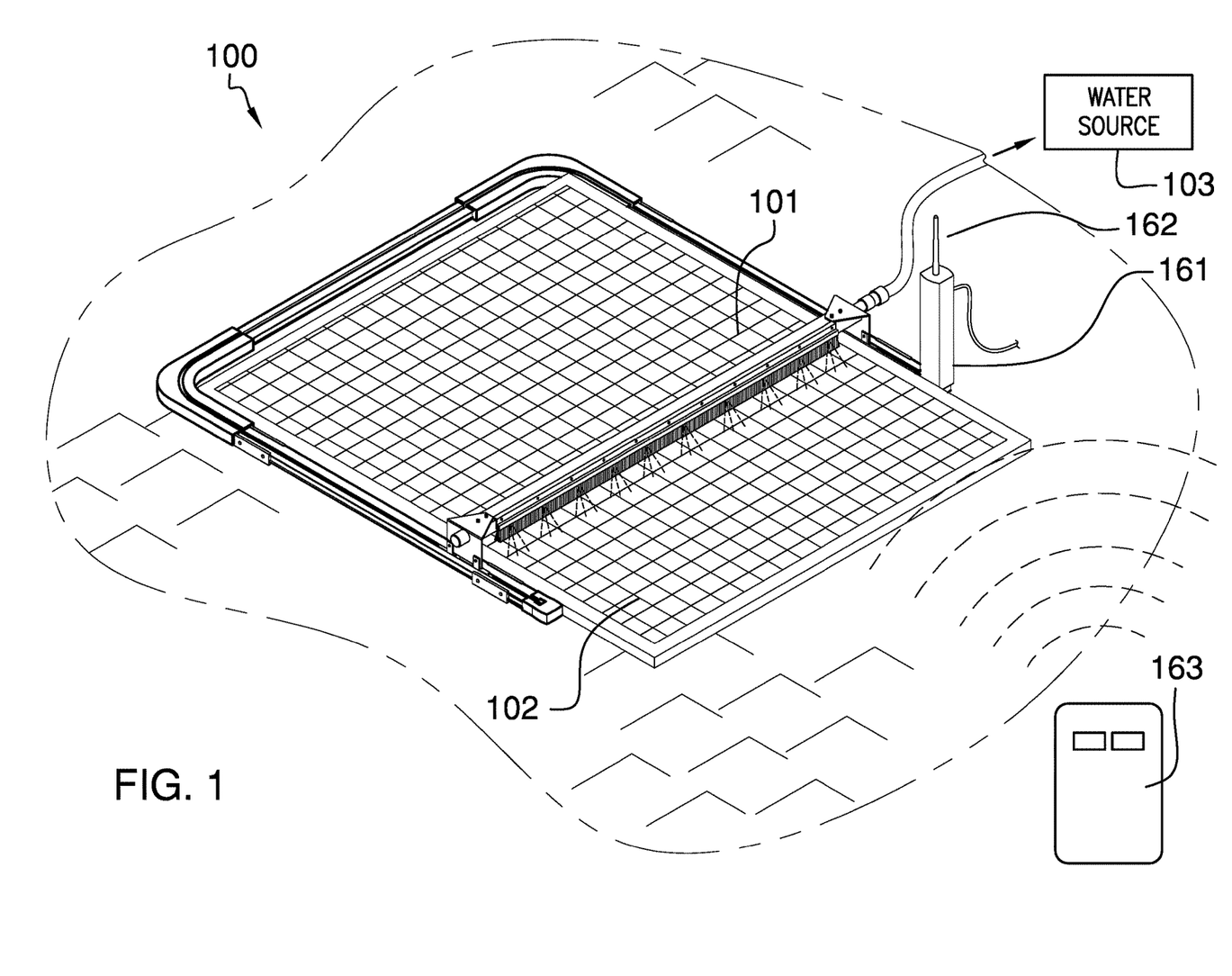
FIG. 1 is an in-use view of an embodiment of the disclosure.
Figure 2:
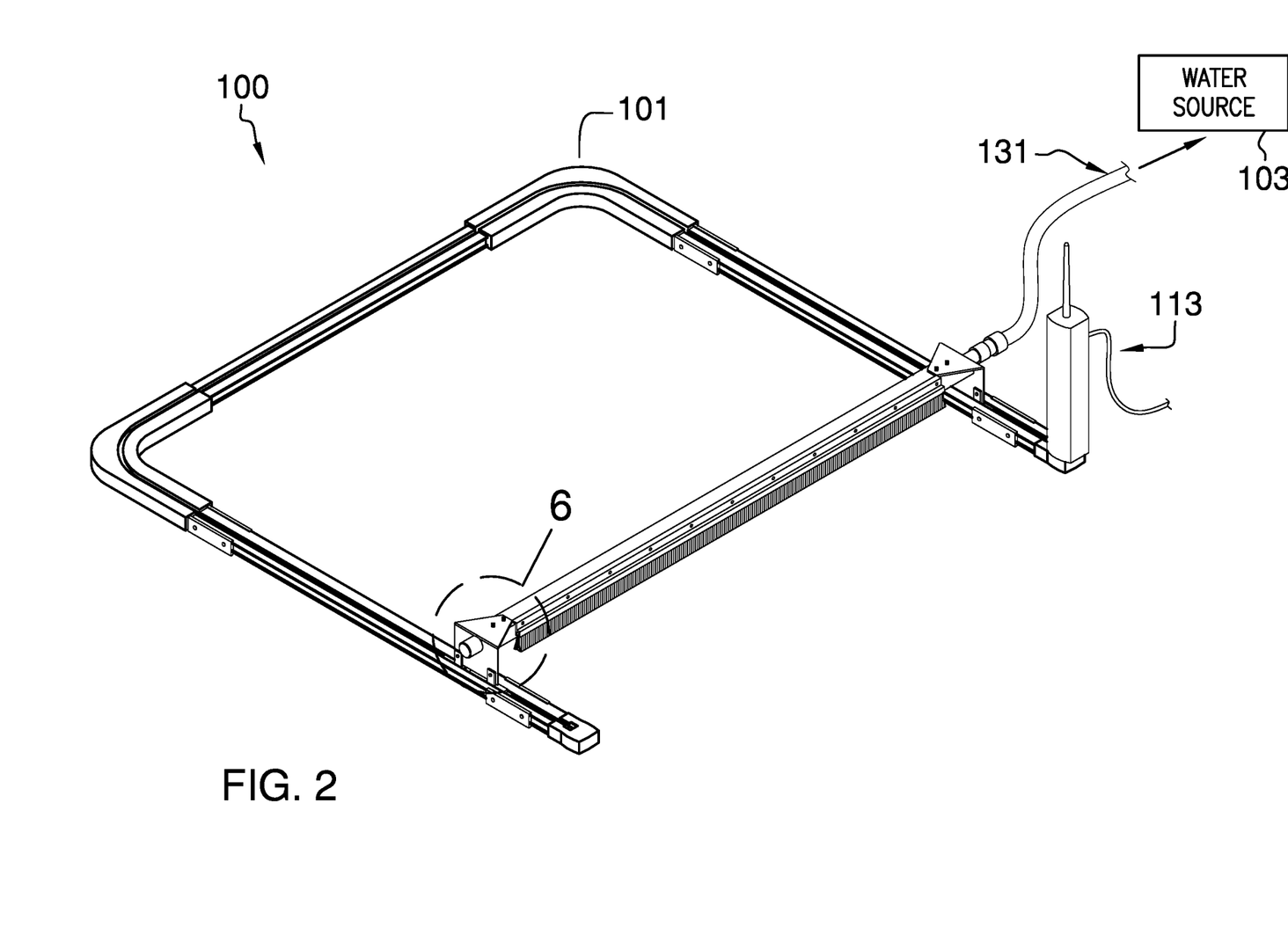
FIG. 2 is a perspective view of an embodiment of the disclosure.
Figure 3:
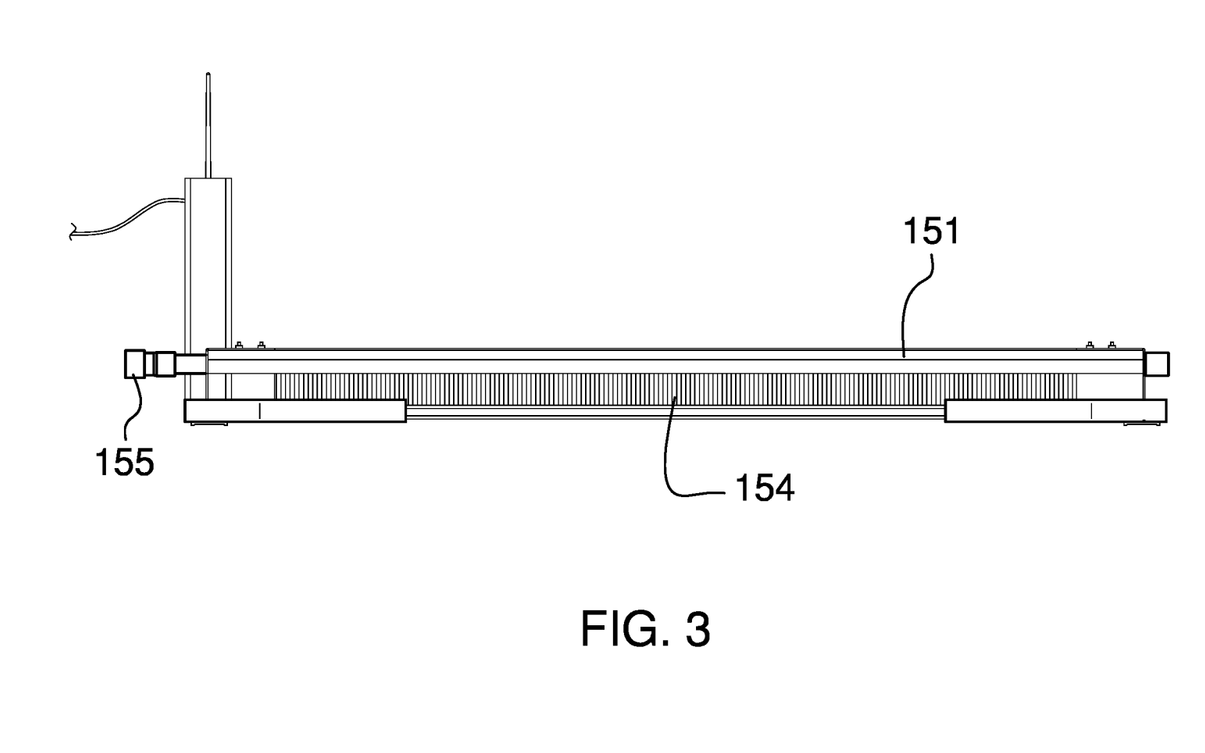
FIG. 3 is a rear view of an embodiment of the disclosure.
Figure 4:
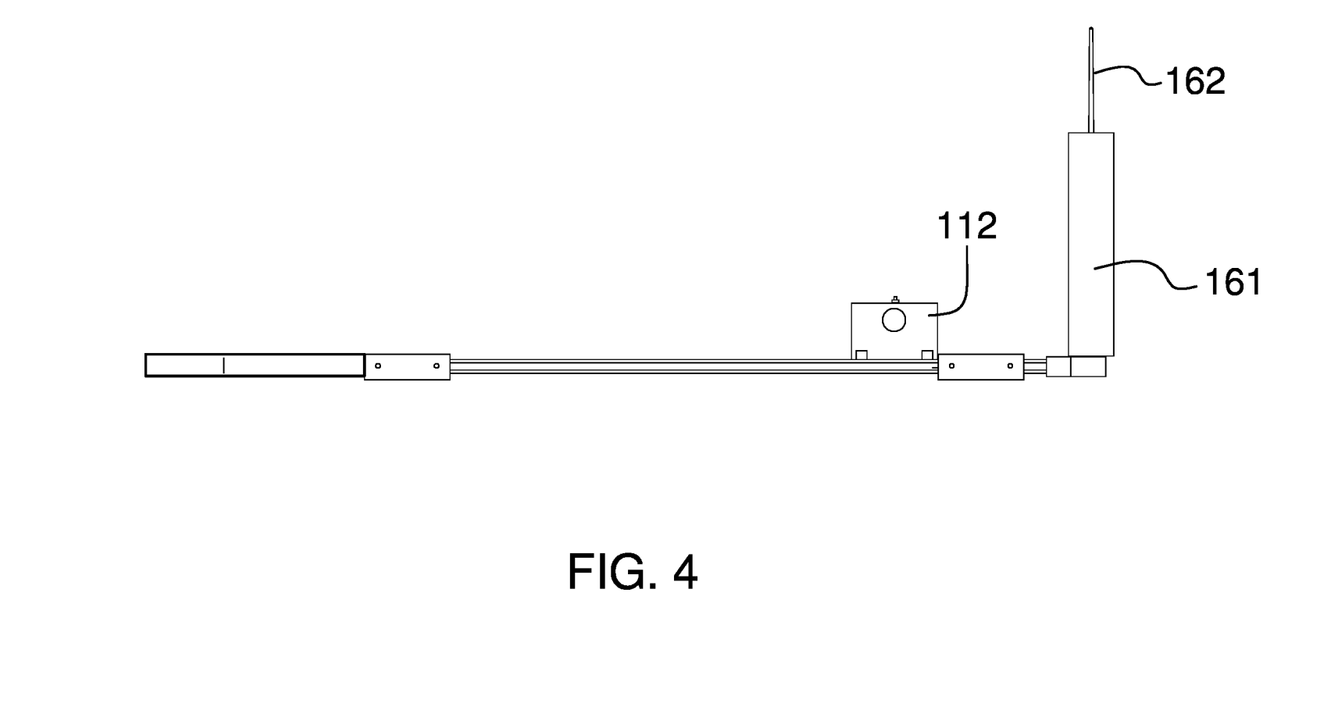
FIG. 4 is a side view of an embodiment of the disclosure.
Figure 5:
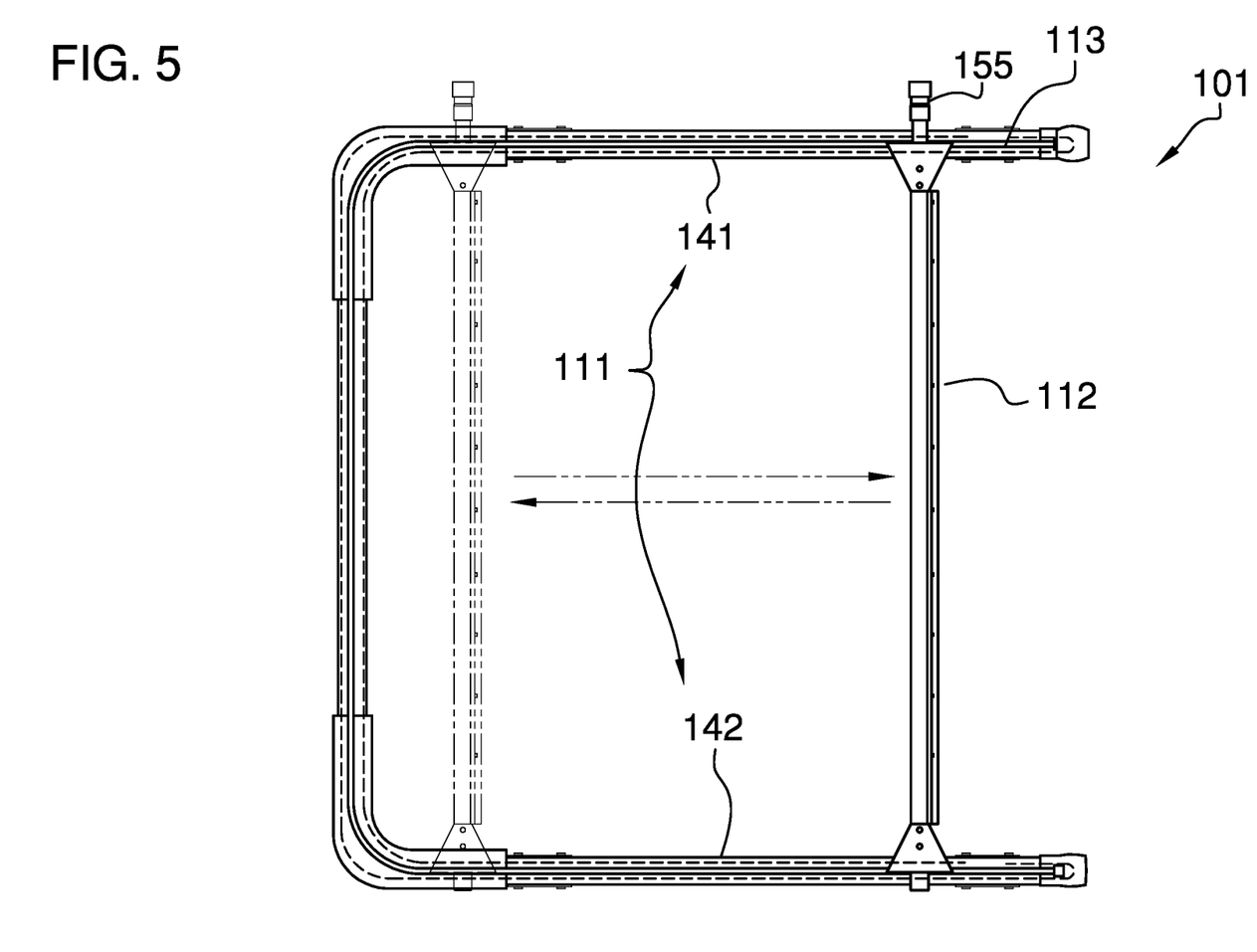
FIG. 5 is a detail view of an embodiment of the disclosure.
Figure 6:
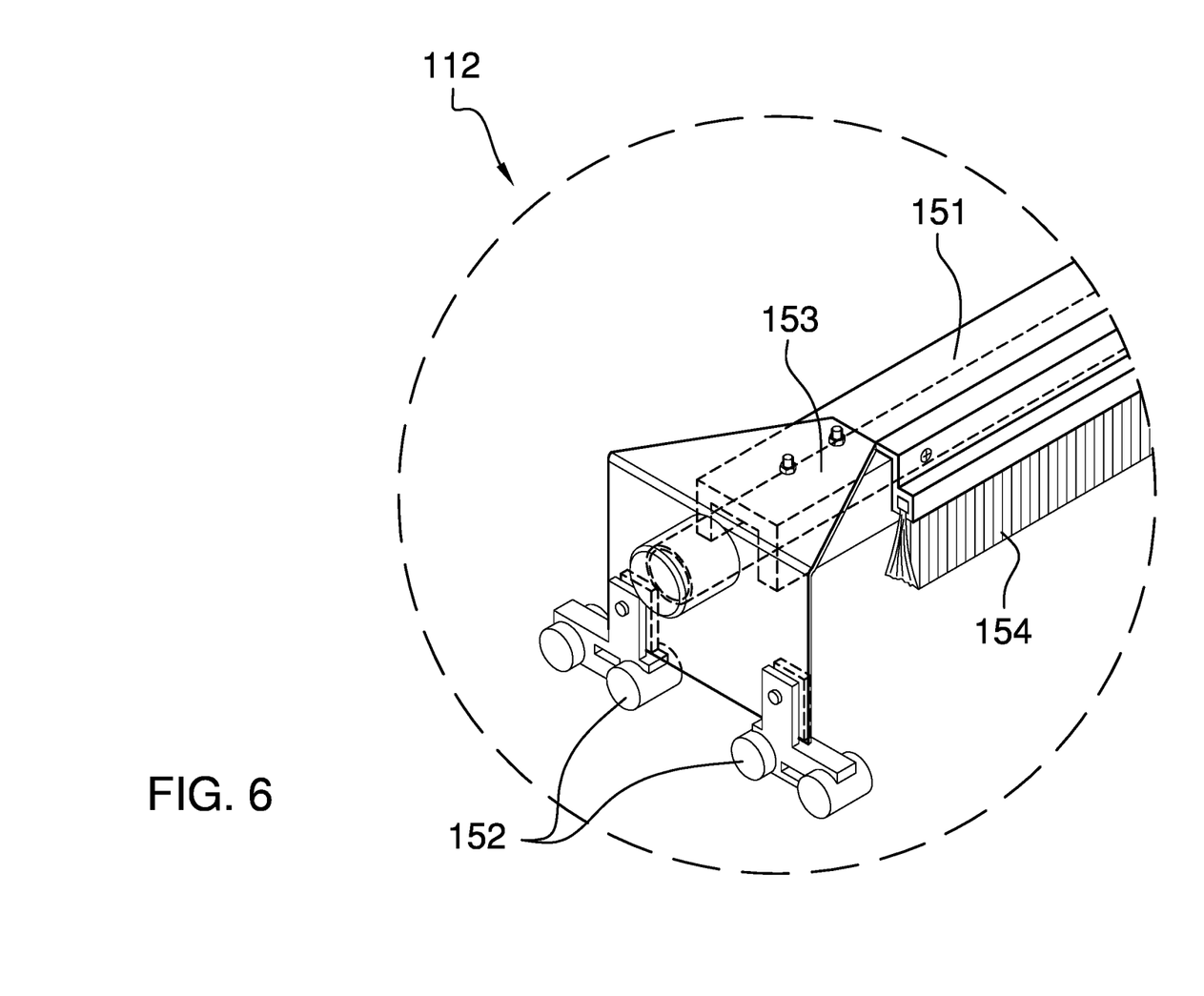
FIG. 6 is a top view of an embodiment of the disclosure.
Figure 7:
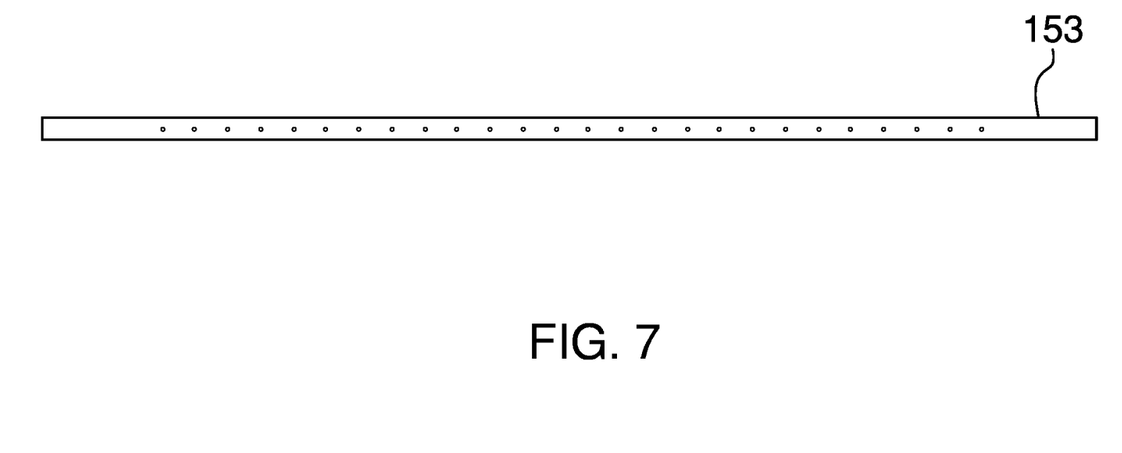
FIG. 7 is a detail view of an embodiment of the disclosure.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A solar panel washing device comprising
a cleaning structure, a photovoltaic cell, and a water source;
wherein the cleaning structure forms a fluidic connection with the water source;
wherein the cleaning structure cleans the photovoltaic cell;
wherein the cleaning structure comprises a perimeter track, a gantry structure, and a belt drive;
wherein the gantry structure and the belt drive mount on the perimeter track;
wherein the belt drive attaches to the gantry structure;
wherein the belt drive provides the motive forces necessary to roll the gantry structure along the perimeter track;
wherein the belt drive comprises a drive motor, a remote control receiver, and a remote control transmitter;
wherein the drive motor is an electric motor;
wherein the drive motor converts electric energy into the rotational energy;
wherein the drive motor forms a linkage with the belt drive such the rotational energy generated by the drive motor provides the belt drive with the motive forces necessary for operation.

2. The solar panel washing device according to claim 1
wherein the cleaning structure discharges water received from the water source onto the photovoltaic cell;
wherein the water source is a source of clean water;
wherein the water source provides the water under pressure to the cleaning structure;
wherein the cleaning structure uses the water received from the water source to clean the photovoltaic cell;
wherein the water source further comprises a hose;
wherein the hose forms a fluidic connection between the water source and the cleaning structure.

3. The solar panel washing device according to claim 2
wherein the photovoltaic cell is an electric device;
wherein the photovoltaic cell converts electromagnetic radiation from the environment into electric energy;
wherein the cleaning structure discharges water received from the water source directly onto the surface of the photovoltaic cell that receives the electromagnetic radiation.

4. The solar panel washing device according to claim 3
wherein the cleaning structure is an electromechanical device;
wherein the cleaning structure is associated with the photovoltaic cell;
wherein the cleaning structure forms a fluidic connection with the photovoltaic cell;
wherein the cleaning structure cleans the photovoltaic cell by discharging water received from the water source directly onto the photovoltaic cell.

5. The solar panel washing device according to claim 4
wherein the perimeter track is a track;
wherein the gantry structure mounts on the perimeter track;
wherein the perimeter track elevates the gantry structure above the photovoltaic cell;
wherein the perimeter track forms a track that guides the motion of the gantry structure over the photovoltaic cell during the cleaning process.

6. The solar panel washing device according to claim 5
wherein the gantry structure is a mechanical apparatus;

wherein the gantry structure forms the structure that cleans the photovoltaic cell;
wherein the gantry structure mounts on the perimeter track;
wherein the gantry structure is a rolling structure;
wherein the gantry structure rolls along the path formed by the perimeter track.

7. The solar panel washing device according to claim 6
wherein the gantry structure rolls over the surface of the photovoltaic cell that receives the electromagnetic radiation;
wherein the gantry structure sprays clean water on the photovoltaic cell;
wherein the belt drive is a mechanical apparatus;
wherein the belt drive is an electrically powered apparatus;
wherein the belt drive is a rotating structure;
wherein the belt drive attaches to the gantry structure;
wherein the belt drive converts electric energy into rotational energy;
wherein the belt drive transmits the converted rotational energy to the gantry structure;
wherein the rotational energy received by the gantry structure provides the motive forces necessary to roll the gantry structure along the path formed by the perimeter track.

8. The solar panel washing device according to claim 7
wherein the perimeter track comprises a first rail and a second rail;
wherein the first rail is a rail;
wherein the first rail forms a track that follows along a portion of the perimeter of the photovoltaic cell;
wherein the first rail is a load bearing structure;
wherein the gantry structure mounts on the first rail such that the gantry structure rolls along the track formed by the first rail;
wherein the first rail forms a load path that transfers a portion of the load of the gantry structure to a load bearing structure;
wherein the second rail is a rail;
wherein the second rail forms a track that follows along a portion of the perimeter of the photovoltaic cell;
wherein the second rail is a load bearing structure;
wherein the gantry structure mounts on the second rail such that the gantry structure rolls along the track formed by the second rail;
wherein the second rail forms a load path that transfers a portion of the load of the gantry structure to a load bearing structure.

9. The solar panel washing device according to claim 8
wherein the gantry structure comprises a u-shaped structure, a plurality of rail wheels, a spray nozzle, a brush structure, and a fitting;
wherein the u-shaped structure is a mechanical structure;
wherein the u-shaped structure forms the substructure that forms the basis of the gantry structure;
wherein the u-shaped structure is a rigid structure;
wherein the u-shaped structure is a u-shaped structure;
wherein the plurality of rail wheels attaches to the u-shaped structure;
wherein the spray nozzle attaches to the u-shaped structure;
wherein the brush structure attaches to the u-shaped structure;
wherein the plurality of rail wheels forms a rolling structure;
wherein the plurality of rail wheels mounts on the perimeter track such that the gantry structure rolls over the perimeter track;
wherein a first subset of rail wheels selected from the plurality of rail wheels mounts on the first rail;
wherein a second subset of rail wheels selected from the plurality of rail wheels mounts on the second rail;
wherein the spray nozzle is a nozzle;
wherein the spray nozzle receives water under pressure from the water source through the fitting;
wherein the spray nozzle receives water from the water source;
wherein the spray nozzle discharges the received water onto the photovoltaic cell as a spray as the gantry structure rolls over the photovoltaic cell;
wherein the brush structure is a brush;
wherein the brush structure sweeps dirt and debris off of the photovoltaic cell as the gantry structure rolls over the photovoltaic cell;
wherein the fitting forms a fluidic connection between the hose from the water source and the spray nozzle;
wherein the fitting feeds water into the spray nozzle.

10. The solar panel washing device according to claim 9
wherein the remote control receiver forms a portion of the control structure of the belt drive;
wherein the remote control receiver is a receiver;
wherein the remote control receiver electrically connects with the drive motor;
wherein the remote control receiver controls the operation of the drive motor;
wherein the remote control receiver receives operating instructions from the remote control transmitter;
wherein the remote control transmitter is a transmitter;
wherein the remote control transmitter transmits operating instructions to the gantry structure and the drive motor;
wherein the remote control transmitter allows for the remote control of the cleaning structure.

* * * * *